US006842575B2

United States Patent
Shimada et al.

(10) Patent No.: US 6,842,575 B2
(45) Date of Patent: Jan. 11, 2005

(54) OPTICAL FIBER CORD AND OPTICAL FIBER CORD WITH A PLUG

(75) Inventors: Katsuhiko Shimada, Tokyo (JP); Kazuki Nakamura, Tokyo (JP); Takeshi Kitayama, Toyama (JP); Takara Yamamoto, Toyama (JP); Hiroe Kubo, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 141 days.

(21) Appl. No.: 10/130,975

(22) PCT Filed: Nov. 29, 2000

(86) PCT No.: PCT/JP00/08421

§ 371 (c)(1),
(2), (4) Date: May 24, 2002

(87) PCT Pub. No.: WO01/40841

PCT Pub. Date: Jun. 7, 2000

(65) Prior Publication Data

US 2003/0007762 A1 Jan. 9, 2003

(30) Foreign Application Priority Data

Nov. 29, 1999  (JP) ........................................... 11-338051

(51) Int. Cl.[7] .............................. G02B 6/02; G02B 6/22
(52) U.S. Cl. ....................................... 385/128; 385/127
(58) Field of Search ................................... 385/123–128

(56) References Cited

U.S. PATENT DOCUMENTS

| 3,980,390 A | | 9/1976 | Yamamoto et al. | |
|---|---|---|---|---|
| 4,274,709 A | | 6/1981 | Asai | |
| 4,639,080 A | * | 1/1987 | Kimura et al. | ............... 385/141 |
| 4,762,392 A | | 8/1988 | Yamamoto et al. | |
| 4,783,135 A | * | 11/1988 | Utsumi et al. | ............... 385/123 |
| 5,496,870 A | * | 3/1996 | Chawla et al. | ................. 522/90 |
| 6,191,187 B1 | * | 2/2001 | Yamamura et al. | ........... 522/96 |
| 6,309,747 B1 | * | 10/2001 | Suwa et al. | ................. 428/378 |

FOREIGN PATENT DOCUMENTS

| DE | 25 12312 A1 | 10/1975 |
|---|---|---|
| DE | 29 47 942 A1 | 6/1980 |
| EP | 0 183 853 A1 | 6/1986 |
| EP | 0 469 542 A2 | 2/1992 |
| FR | 2 265 107 | 10/1975 |
| FR | 2 384 271 | 10/1978 |
| FR | 2 443 073 | 6/1980 |
| GB | 1 466 224 | 3/1977 |

(List continued on next page.)

Primary Examiner—Brian Healy
Assistant Examiner—Kevin S. Wood
(74) Attorney, Agent, or Firm—Fitch, Even, Tabin & Flannery

(57) ABSTRACT

The optical fiber cord of the present invention is characterized in having a primary covering layer formed from a polyamide resin that incorporates at least one of an organic acid or an organic acid anhydride on the outer periphery of the optical fiber. In addition, the optical fiber cord with a plug of the present invention has a plug on at least one end of the optical fiber cord of the present invention having a secondary covering layer on the outer periphery, wherein at the end part of the optical fiber cord that has the plug, the primary covering layer is exposed, and the plug is fastened to the exposed primary covering layer. By using the structure described above, an optical fiber cord and an optical fiber cord with a plug that has superior humidity resistance and heat resistance, and in addition can be laid easily in narrow sites because of superior flexibility and is inexpensive. The optical fiber cord and the optical fiber cord with a plug of the present invention can be favorably employed in uses that require thermal resistance such as installation on a vehicle or in factory automation (FA).

14 Claims, 1 Drawing Sheet

FOREIGN PATENT DOCUMENTS

| | | |
|---|---|---|
| GB | 2 037 450 A | 7/1980 |
| JP | 50-125754 | 10/1975 |
| JP | 51-86555 A | 7/1976 |
| JP | 51-100734 | 9/1976 |
| JP | 53-14755 A | 2/1978 |
| JP | 55-95902 A | 7/1980 |
| JP | 59-31901 A | 2/1984 |
| JP | 61-22313 A | 1/1986 |
| JP | 63-221163 A | 9/1988 |
| JP | 64-24852 A | 1/1989 |
| JP | 01-198705 A | 8/1989 |
| JP | 4-76053 A | 3/1992 |
| JP | 07-077642 A | 3/1995 |
| JP | 10-332997 A | 12/1998 |
| JP | 11-95044 A | 4/1999 |
| WO | WO 85/05699 A1 | 12/1985 |

* cited by examiner

OPTICAL FIBER CORD AND OPTICAL FIBER CORD WITH A PLUG

CROSS-REFERENCED APPLICATIONS

This application is a National phase of International Application PCT/JP00/08421, filed Nov. 29, 2000, which designated the U.S. and that International Application was not published under PCT Article 21(2) in English.

TECHNICAL FIELD

The present invention relates to an optical fiber cord having a covering layer on the outer periphery of a plastic optical fiber, and an optical fiber cord with a plug that has a plug at the end thereof.

The present invention is based on Patent Application No. Hei 11-338051 filed in Japan, the contents of which are incorporated in part into the present application.

BACKGROUND ART

A plastic optical fiber (below, referred to as an "optical fiber") is easy to handle because it has a large diameter, and is inexpensive. Thus, it is widely used in telecommunication over short distances. An optical fiber for telecommunications generally is used in the form of an optical fiber cord in which the outer periphery of the optical fiber is covered by a resin. In the case that the optical fiber cord is subject to end surface processing, in the typically used method, the covering material at the end of the optical fiber cord is removed and it is inserted into a plug, anchored by being crimped, and then the optical fiber end surface, which projects about 0.2 mm from the plug end surface, is pressed on a heat plate, and the end surface undergoes a fusion smoothing process. A plug such as F05, F07 that is standardized under ATM standards or the like can also be used.

However, in the case that the optical fiber cord with a plug manufactured by the method described above is used in a severe environment, such as one having a high temperature and a high humidity, fluctuations in form due, for example, to thermal expansion and shrinkage occur in the optical fiber in the plug, and as a result, the protrusion and retraction (pistoning) of the optical fiber from the plug end surface occur. In the case that the protrusion and retraction (pistoning) of the optical fiber from the plug end surface occur, the distance between the light source or the light receiving elements and the optical fiber end surface changes, the amount of received light emitted from the optical fiber fluctuates, and there is the concern that damage will be caused to the system.

In order to solve this problem, in Japanese Patent Application, First Publication No. Hei 7-77642, an optical fiber cord has been proposed wherein, as a primary covering layer, a covering material having a good adhesion with a strand and having a small thermal change covers the optical fiber periphery, and furthermore, as a secondary covering layer, another resin covers the outer periphery thereof. In addition, a method has been proposed wherein, at the end part of the optical fiber cord, the secondary covering layer is eliminated, and the plug is fastened on the primary covering layer.

However, this optical fiber cord has the problem that hydrogen fluoride is generated during baking because a fluorine resin is used as the primary covering layer. In addition, there are the problems that laying the optical fiber cord in a narrow site is difficult because of the lack of flexibility of the primary covering material, and that the cost is high

DISCLOSURE OF INVENTION

It is an object of the present invention to provide an optical fiber cord and an optical fiber cord with a plug which have superior humidity resistance and thermal resistance, are easily laid in a narrow site due to superior flexibility, and are inexpensive.

The optical fiber cord of the present invention comprises an optical fiber and a primary covering layer on the outer periphery of the optical fiber that is formed from a polyamide resin containing at least one of an organic acid or an organic acid anhydride.

In addition, the optical fiber cord of the present invention is characterized in that the primary covering layer contains an organic acid anhydride and does not contain an organic acid.

In addition, the optical fiber cord of the present invention is characterized in having a secondary layer on the outer periphery of the optical fiber cord.

In the case that the optical fiber cord of the present invention has a primary covering layer that is formed from a polyamide resin that comprises an organic acid, preferably one or a plurality of compounds selected from a group comprising methacrylic acid, acrylic acid, maleic acid, fumaric acid, salicylic acid, succinic acid, glutaric acid, and phthalic acid is used as the organic acid.

In the case that the optical fiber cord of the present invention has a primary covering layer that is formed from a polyamide resin that comprises an organic acid anhydride, preferably one or a plurality of compounds selected from a group comprising methacrylic acid anhydride, acrylic acid anhydride, maleic acid anhydride, fumaric acid anhydride, salicylic acid anhydride, succinic acid anhydride, glutaric acid anhydride, and phthalic acid anhydride is used as the organic acid anhydride.

In addition, in the optical fiber cord of the present invention, the total amount of organic acid and organic acid anhydride is 0.01 to 10 parts by mass per 100 parts by mass of the polyamide resin.

In addition, in the optical fiber cord of the present invention, when the cross sectional area of the primary covering layer is denoted by B and the cross sectional area of the optical fiber is denoted by A, preferably B/A is 0.6 to 3.5.

In addition, in the optical fiber cord of the present invention, the extraction strength between the optical fiber and the primary covering layer (the separation strength between the optical fiber and the primary covering layer) is preferably equal to or greater than 50N.

In addition, in the optical fiber cord of the present invention, the polyamide resin that forms the primary covering layer preferably comprises nylon 12 or nylon 11 as the main component.

Using the optical fiber cord of the present invention having a secondary covering layer on the periphery of the optical fiber cord, the optical fiber cord with a plug of the present invention below can be provided.

The optical fiber cord with a plug of the present invention has a plug at least at one end of the optical fiber cord of the present invention that has a secondary covering layer on the outer periphery of the optical fiber cord, and the optical fiber cord is characterized in that the primary covering layer is exposed at the end part having the plug, and the plug is fastened to the exposed primary covering layer.

BEST MODE FOR CARRYING OUT THE INVENTION

Figure 1:
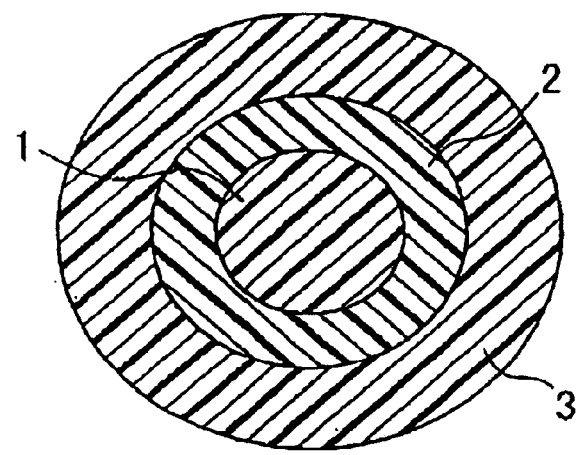
FIG. 1 is a cross-sectional drawing of an example of the optical fiber cord of the present invention.

In the present invention, a well-known optical fiber can be used as an optical fiber. For example, a SI type optical fiber that has a structure wherein the external surface of the fiber-shaped core is covered by a cladding, and the refractive index changes rapidly at the boundary between the core and the cladding, is known.

In addition, as an optical fiber comprising only a fiber-shaped core, for example, a GI type optical fiber in which the refractive index of the core decreases continuously from the center towards the outer periphery and a multi-layered optical fiber in which a plurality of cores are formed by lamination from the center towards the outer periphery and the refractive index of the core decreases stepwise are known.

Furthermore, a multi-core optical fiber in which a plurality of fiber-shaped island parts are integrated in a state in which they are separated by the common sea part are known. The island part can have a structure comprising only a core, and can have a structure in which a cladding is formed on the periphery of the core.

Among the optical fibers described above, in order to carry out high-speed signal transmission by making the optical fiber broadband, preferably a GI type optical fiber or a multi-layered optical fiber is used. In addition, a cladding can cover the outer periphery of the GI type optical fiber and multi-layered optical fiber.

In addition, a protective layer is preferably formed on the outer periphery of these optical fibers, because by making the structure in this manner, the amount of light that can be transmitted by the optical fiber can be increased. Moreover, in the present specification, a protective layer denotes a layer that is optically transparent, has a capacity to reflect and propagate light that leaks from the core or cladding into the optical fiber when light is propagating through the optical fiber, and is formed as the outermost peripheral part of the optical fiber. The protective layer and the inner layer such as core or cladding are preferably attached together, for example, by being placed in mutual contact in a fusion state during manufacture of the optical fiber, and substantially integrated.

As the material used in the core, for example, a polymer having high transparency, such as polymethyl methacrylate, polystyrene, polycarbonate, non-crystal polyolefine, and preferably a methyl methacrylate polymer is used.

As a methyl methacrylate polymer, a methyl methacrylate homopolymer, or a copolymer comprising methyl methacrylate as the main component, or a copolymer comprising benzyl methacrylate as the main component, or a fluoroalkyl methacrylate polymer is preferable, and among these, a methyl methacrylate homopolymer is particularly preferable.

A well-known polymer is used as a cladding. Examples are a fluoroalkyl methacrylate copolymer, a vinylidene fluoride copolymer, an α-fluoroalkyl acrylate copolymer, and a silicone resin. In particular, a copolymer of fluoroalkyl methacrylate and methyl methacrylate, a blend of vinylidene fluoride copolymer and methyl methacrylate polymer, or the like is preferably used.

In addition, in the case that a resin having a comparatively high refractive index such as polystyrene or polycarbonate is used as the core, materials such as methyl methacrylate and polymethylpentene can be used as the cladding.

As a material for the protective layer, materials that are well known can be used. Examples are a copolymer of short-chain fluoroalkyl methacrylate, long-chain fluoroalkyl methacrylate, and methyl methacrylate, which is used in a general optical fiber having a high angular aperture, and a vinylidene fluoride polymer. As a vinylidene fluoride polymer, a vinylidene fluoride homopolymer, a copolymer comprising vinylidene fluoride and tetrafluoroethylene are preferably used. In the case of using a copolymer comprising vinylidene fluoride and tetrafluoroethylene, incorporating vinylidene fluoride at 10 to 30 mol % is preferable because the transparency is high.

In order to increase the extraction strength between the primary covering layer and the optical fiber easily, a mixture of a methyl methacrylate polymer and another polymer is preferably used as a material for the protective layer, and a mixture of a methyl methacrylate polymer and said vinylidene fluoride polymer is more preferably used.

In order to obtain a mixture having a high transparency, preferably as a methyl methacrylate polymer, a methyl-methacrylate homopolymer or a copolymer comprising methyl methacrylate as a main constituent and another monomer is preferably used. Among these, the methyl methacrylate homopolymer is particularly preferably used.

In order to effectively suppress the pistoning in the case that the optical fiber cord of the present invention is used in an environment having high temperature such as 70 to 80° C. or severe differences in temperature, preferably an optical fiber having a small thermal shrinkage rate is used, and more preferably, an optical fiber is used that has a thermal shrinkage rate in the range of 0 to 0.5% when heated for 50 hours at 90° C.

The method in which the optical fiber undergoes heat treatment is an example of a method for obtaining an optical fiber having such a small thermal shrinkage. This heat treatment can be carried out continuously or carried out once for each batch. Here, the glass transition start temperature Tg of the core of the optical fibers measured according to the JIS K 7121-1987 and the heat treatment temperature T are temperatures that preferably satisfy Tg−30≦T<Tg, and the heat treatment is carried out for 100 hours or less for each batch.

Moreover, the method of measurement of the glass transition start temperature Tg according to JIS K 7121-1987 is carried out as follows. The glass transition start temperature Tg is measured by carrying out differential scanning calorimetry (DSC) or differential thermal analysis (DTA) on the test piece that is exposed for 24 hours or more in an environment of 23° C.±2° C. at a relative humidity of 50±5%. Specifically, the intersection of the straight line obtained from the DSC curve or the DTA curve at a heating rate of 20° C./minute by extending the base line on the low temperature side to the high temperature side beyond the stepwise changing part of the glass transition and the tangent of the DSC (DTA) at the point where the slope of the DSC (DTA) curve at the stepwise change part of the glass transition becomes maximum serves as the glass transition temperature.

The optical fiber cord of the present invention is formed by a primary covering layer that is formed from a polyamide resin comprising at least one of an organic acid or an organic acid anhydride covering the outer periphery of the optical fiber described above.

In addition, in the present invention, because the polyamide resin is doped with at least one of an organic acid or an organic acid anhydride, the optical fiber cord of the present invention not only has a superior flexibility but can dramatically improve the adhesiveness between the optical fiber and the primary covering layer, and thus the thermal expansion and thermal shrinkage of the optical fiber cord is decreased, and when used as an optical fiber cord with a plug, the pistoning phenomenon can be effectively restrained.

In addition, even in the case that the amount of doped organic acid or organic acid anhydride is small, the adhesion between the optical fiber and the primary covering layer is dramatically improved. Therefore, because the organic acid or the organic acid anhydride can be doped in a small amount, the occurrence of a reduction of the characteristics such as the thermal resistance of the primary covering layer and the optical fiber cord that is caused by the dopant can be prevented. Furthermore, in the case that an organic acid or an organic acid anhydride is incorporated into the primary covering layer, the polyamide resin can effectively prevent the migration of the organic acid or the organic acid anhydride into the optical fiber.

Because the optical fiber cord of the present invention has the properties described above, it can be advantageously employed in uses that require thermal resistance, such as being mounted in a vehicle or in factory automation (FA).

As the polyamide resin that can be used in the primary covering layer, for example, nylon 66, nylon 6, nylon 11, nylon 12, nylon 612, nylon 621, nylon co-polymers, nylon elastomers, and the like are used. Among these, in particular a polyamide resin in which the main constituent is nylon 11 or nylon 12, which can easily cover the optical fiber because of their comparatively low melting point and have superior dimensional stability in a high temperature environment because of low coefficient of water absorption, is preferably used.

As an organic acid that can be used in the primary covering layer, preferably methacrylic acid, acrylic acid, maleic acid, fumaric acid, salicylic acid, succinic acid, glutaric acid, phthalic acid, and the like are used, and as an organic acid anhydride, the anhydrides of these organic acids can preferably be used. As an organic acid anhydride, in particular maleic acid anhydride, fumaric acid anhydride, glutaric acid anhydride are preferably used. One or two or more of these organic acids and organic acid anhydrides can be used.

Preferably a mixture of an organic acid and an organic acid anhydride is not used because the strength of the optical fiber decreases due to their deposition. In addition, in the case that one of an organic acid or an organic acid anhydride is used, preferably an organic acid anhydride is used rather than an organic acid. In the case that an organic acid anhydride is used, because there is no dehydration due to the association between organic acids when the organic acid anhydride and the polyamide resin are fused and mixed, or when the primary covering layer is fused and layered on the optical fiber, and because there is no generation of water molecules, a decrease in the molecular weight due to the hydrolysis of the polyamide resin occurs with difficulty, and the deterioration of the properties such as the mechanical strength of the primary covering layer and the optical fiber cord can be prevented.

The amount of incorporated organic acid and organic acid anhydride is preferably 0.01 to 10 parts by mass, more preferably 0.05 to 8 parts by mass, and most preferably 0.1 to 5 parts by mass per 100 parts by mass of polyamide resin.

There is a concern that when the amount of incorporated organic acid and organic acid anhydride is less than 0.01 parts by mass, the effect of the improvement of the adhesion of the optical fiber and the primary covering layer is insufficient. In addition, there is a concern that when the amount of incorporated organic acid and organic acid anhydride exceeds 10 parts by mass, the heat resistance of the polyamide resin deteriorates, and pistoning occurs in a high temperature environment.

In the optical fiber cord of the present invention, the cross-sectional area of the primary covering layer is not particularly limited, but when the cross-sectional area of the primary covering layer is denoted by B and the cross-sectional area of the optical fiber is denoted by A, B/A is preferably equal to or greater than 0.6, more preferably equal to or greater than 0.7, and most preferably equal to or greater than 0.75 in order to effectively limit changes in the shape of the optical fiber in a high humidity and high temperature environment.

In addition, in order to improve the flexibility of the optical fiber cord and make it easy to handle, B/A is preferably equal to or less than 3.5, more preferably equal to or less than 3.0, and most preferably equal to or less than 2.5.

In addition, in order to decrease the thermal expansion and thermal shrinkage of the optical fiber cord sufficiently, the extraction strength between the optical fiber and the primary covering layer is preferably equal to or greater than 50N.

The optical fiber cord of the present invention can be covered by a secondary covering layer on the outer periphery of the primary covering layer. As the secondary covering layer, a polyamide resin having a superior heat resistance and solvent resistance is preferably used. Another covering layer or a plurality of covering layers can be formed on the outer periphery of the secondary covering layer.

FIG. 1 is an example of a cross-sectional drawing of the optical fiber cord of the present invention that has a two covering layer structure. FIG. 1 is a cross-sectional drawing showing an example of the optical fiber of the present invention when cut perpendicular to the direction of the central axis of the optical fiber. The optical fiber cord shown in FIG. 1 is formed by the primary covering layer 2 and the secondary covering layer 3 covering the outer periphery of the optical fiber 1 in sequence coaxially.

The optical fiber cord with a plug of the present invention is structured such that at the end part of the side where the plug of the optical fiber having two or more layers, the primary covering layer is exposed, and the plug is fastened to the exposed primary covering layer. Well-known plugs can be used. In addition, the fastening of the plug can be carried out by well-known methods, and the method of crimping the primary covering layer can be given as an example thereof.

EXAMPLES

Below, the invention will be explained in further detail according to the Examples.

Production of the Optical Fiber

In the Examples 1 to 6 and Comparative Example 1, a homopolymer of methyl methacrylate (MMA) was used, as the raw material for the core, and a copolymer of trifluoroethyl methacrylate (3FM)/1, 1, 2, 2-H-perfluorodecyl methacrylate (17FM)/MMA/methacrylic acid (MAA)=30/50/18/2 (parts by mass) was used as a raw material for the cladding, a copolymer of vinylidene fluoride/tetrafluoroethylene/hexafluoropropylene=70/20/10 (mol %) was used as the material for the protective layer. An optical fiber was obtained by multi-component fiber formation by laminating these in sequence coaxially from the center by fusion. The inner diameter of the core was 970 μm, the thickness of the cladding was 5 μm, and the thickness of the protective layer was 10 μm.

In Examples 1 to 6 and Comparative Example 1, an optical fiber cord was obtained by forming either a primary covering layer and a secondary covering layer or only a primary covering layer on the surface of the optical fiber manufactured as described above by changing the material and thickness. The material and the thickness of the primary covering layer and the secondary covering layer and the ratio B/A of the cross-sectional area (B) of the primary covering layer and the cross-sectional area (A) of the optical fiber for each of the optical fiber cords obtained in the Examples 1 to 6 and Comparative Example 1 are shown in Table 1.

Example 1

In Example 1, methacrylic acid was dissolved in acetone, mixed with nylon 12 (daiamide 12 L1640, made by Daicel-Huels Co.) and subsequently in a vacuum dryer the acetone was volatilized, and the obtained compound of methacrylic acid and nylon 12 was kneaded in an extruder having a vent port and two axes, and a compound of methacrylic acid and nylon 12 incorporating 2 parts by mass of methacrylic acid per 100 parts by mass of nylon 12 was obtained.

The obtained compound was covered over the optical fiber described above in a cross head cable covering apparatus, and a primary covering layer having a thickness of 250 μm was formed, and an optical fiber cord having an outer diameter of 1.5 mm was obtained.

On the outer periphery of this optical fiber cord, nylon 12 (daiamide 12 L1640) was covered using a cross head cable covering apparatus, and a secondary covering layer having a thickness of 350 μm was formed, and an optical fiber cord having an outer diameter of 2.2 mm and a two covering layer structure was obtained.

Moreover, the ratio B/A of the cross sectional area (B) of the primary covering layer and the cross-sectional area (A) of the optical fiber of the optical fiber cord manufactured in Example 1 is 0.98.

Example 2

In Example 2, except for forming a primary covering layer comprising a mixture of maleic acid and nylon 12 that incorporates 2 parts by mass of maleic acid per 100 parts by mass of nylon 12, the optical fiber cord was obtained under conditions identical to those of Example 1. The ratio B/A of the cross-sectional area (B) of the primary covering layer and the cross-sectional area (A) of the optical fiber of the optical fiber cord manufactured in Example 2 is 0.98.

Example 3

In Example 3, except for making the amount of maleic acid incorporated in the primary covering layer 1 part by mass per 100 parts by mass of nylon 12, and making the thickness of the primary covering layer 150 μm and the thickness of the secondary covering layer 450 μm, the optical fiber cord was obtained under conditions identical to those of Example 2. The ratio B/A of the cross-sectional area (B) of the primary covering layer and the cross-sectional area (A) of the optical fiber of the optical fiber cord manufactured in Example 3 is 0.69.

Example 4

In Example 4, except for forming a primary covering layer comprising a mixture of maleic acid anhydride and nylon 11 that incorporates 1 part by mass of maleic acid anhydride per 100 parts by mass of nylon 11, the optical fiber cord was obtained under conditions identical to those of Example 1. The ratio B/A of the cross-sectional area (B) of the primary covering layer and the cross-sectional area (A) of the optical fiber of the optical fiber cord manufactured in Example 4 is 0.98. Rilsan BMN-O (manufactured by Atofina Co.) was used as the nylon 11.

Example 5

In Example 5, except for forming a primary covering layer comprising a mixture of phthalic acid anhydride and nylon 12 that incorporates 1 part by mass of phthalic acid anhydride per 100 parts by mass of nylon 12, and forming a secondary covering layer comprising nylon 11, the optical fiber cord was obtained under conditions identical to those of Example 3. The ratio B/A of the cross-sectional area (B) of the primary covering layer and the cross-sectional area (A) of the optical fiber of the optical fiber cord manufactured in Example 5 is 0.69. Rilsan BMN-O (manufactured by Atofina Co.) was used as the nylon 11.

Example 6

In Example 6, except for forming a primary covering layer comprising a mixture of glutaric acid anhydride and nylon 11 that incorporates 1 part by mass of glutaric acid anhydride per 100 parts by mass of nylon 11, and forming a secondary covering layer comprising nylon 11, the optical fiber cord was obtained under conditions identical to those of Example 1. The ratio B/A of the cross-sectional area (13) of the primary covering layer and the cross-sectional area (A) of the optical fiber of the optical fiber cord manufactured in Example 6 is 0.98. Rilsan BMN-O (manufactured by Atofina Co.) was used as the nylon 11.

Comparative Example 1

In Comparative Example 1, except for forming a primary covering layer comprising only nylon 12, having a thickness of 600 μm, and forming no secondary covering layer, the optical fiber cord was obtained under conditions identical to those of Example 1. The ratio B/A of the cross-sectional area (B) of the primary covering layer and the cross-sectional area (A) of the optical fiber of the optical fiber cord manufactured in Comparative Example 1 is 3.84.

Measurement Method

In addition, a performance measurement of each of the optical fiber cords obtained in the Examples 1 to 6 and the Comparative Example 1 was carried out. Below, the measurement categories and the measurement methods are explained.

1. Transmission Loss

The transmission loss for each of the optical fiber cords obtained in Examples 1 to 6 and Comparative Example 1 were measured. The measurement of the transmission loss was carried out using a 25 m—5 m cut back method using an optical fiber cord having a length of 25 m and an optical fiber cord having a length of 25 m with 5 m cut off under the conditions in which a light having a wavelength of 650 nm was used and an excitation NA=0.1.

2. Extraction Strength

The extraction strength for each of the optical fiber cords obtained in Examples 1 to 6 and the Comparative Example 1 was measured.

Figure 2:
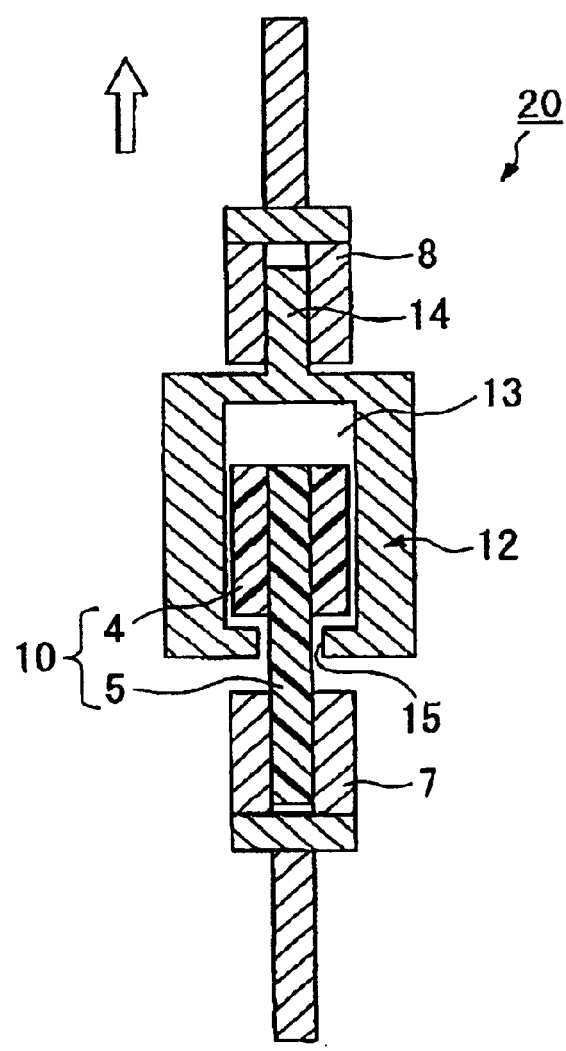
FIG. 2 is a drawing showing the method of measuring the extraction strength.

As shown in FIG. 2, the extraction strength was measured using a measuring device 20 comprising a jig 12 that supports the optical fiber cord 10, a chuck 8 that holds the projection 14 formed at one end of the jig 12, and a chuck 7 that holds the peeled portion 5 of the optical fiber cord 10. On the jig 12, a holding chamber 13 that accommodates the covering portion 4 of the optical fiber cord 10 and the through hole 15 that is larger than the peeled portion 5 of the optical fiber cord 10 and narrower than the covering portion 4 are formed.

In carrying out the measurement, an optical fiber cord 10 that has the covering layer at one end peeled off is prepared, and the length of the covering portion 4 of the optical fiber cord 10 is cut so as to be 30 mm. Moreover, in the case of measuring the extraction strength (peeling strength) between the optical fiber and the primary covering layer, the primary covering layer and the secondary covering layer are peeled off, and in the case of measuring the extraction strength between the primary covering layer and secondary covering layer, only the secondary covering layer is peeled off.

Next, the covering portion 4 of the optical fiber cord 10 is accommodated in the holding chamber 13 formed in the jig 12, and the peeled portion 5 of the optical fiber cord 10 is extracted from the through hole 15.

Next, the projection 14 formed at one end of the jig 12 is held by the chuck 8, and the peeled portion 5 of the optical fiber cord 10 is held by the chuck 7.

Next, along the coaxial direction (the direction of the arrow in the figure) of the optical fiber (optical fiber cord 10), the jig 12 is pulled by moving the chuck 8 at a constant speed of 50 mm/min, and in the covering portion 4 of the optical fiber cord 10, the portion thicker than the peeled portion 5 is extracted. From the curve that shows the relationship between the extraction stress at this time and the amount of displacement in the extraction direction of the portion thicker than the peeled portion 5 in the covering portion 4 of the optical fiber cord 10, the peak value of the stress during extraction is read and the measured value is obtained.

3. Pistoning

For each of the optical fiber cords obtained in the Examples 1 to 6 and the Comparative Example 1, the primary covering layer is exposed by peeling the secondary covering layer at the end of the optical fiber cord, it is inserted into the plug having an inner diameter 50 μm larger than the diameter of the primary covering layer, the primary covering layer is fastened by crimping, and thereby the optical fiber cord with a plug is manufactured. The pistoning test of the obtained optical fiber cord with a plug is carried out.

After leaving the 50 cm optical fiber cord with a plug for 1000 hours in an atmosphere having a temperature of 85° C. and a relative humidity of 95%, the length of the projection or retraction of the optical fiber cord from the plug end surface was measured.

Results

The results of carrying out the capacity measurement of each of the optical fiber cords obtained in Examples 1 to 6 and the Comparative Example 1 are shown in Table 1.

In Examples 1 to 6, which incorporate an organic acid or an organic acid anhydride in the primary covering layer, the obtained optical fiber cord has a favorable transmission loss of 121 to 129 dB/km, and has an extraction strength between the optical fiber and the primary covering layer of 75 to 85N, which is equal to or greater than 50 N. In addition, the extraction strength between the primary covering layer and the secondary covering layer is 20 to 25 N. In addition, the projection and retraction of the optical fiber form the plug end surface in the pistoning test of the obtained optical fiber cord with a plug was a small −10 to 0 μm, and in particular, in the Examples 1, 2, and 4, no projection or retraction of the optical fiber from the plug end surface in the pistoning test occurred.

In contrast to this, in Comparative Example 1, in which an organic acid or an organic acid anhydride was not incorporated into the primary covering layer, the obtained optical fiber cord had a favorable transmission loss of 125 dB/km However, the extraction strength between the optical fiber and the primary covering layer was 25N, less than 50 N, which is small compared to the Examples 1 to 6. In addition, the projection and retraction of the optical fiber from the plug end surface in the pistoning test of the obtained optical fiber cord with a plug was −40 μm, which is large in comparison to the Examples 1 to 6.

TABLE 1

| | Primary covering layer | | | Secondary covering layer | | Transmission loss (dB/km) | Extraction strength (N) | | Pistoning (μm) |
| --- | --- | --- | --- | --- | --- | --- | --- | --- | --- |
| | Material | Thickness (μm) | B/A | Material | Thickness (μm) | | Optical fiber/primary covering layer | Primary covering layer/secondary covering layer | |
| Example 1 | nylon 12/MAA 100/2 parts by mass | 250 | 0.98 | nylon 12 | 350 | 122 | 80 | 23 | 0 |
| Example 2 | nylon 12/maleic acid 100/2 parts by mass | 250 | 0.98 | nylon 12 | 350 | 124 | 75 | 25 | 0 |
| Example 3 | nylon 12/maleic acid 100/1 parts by mass | 150 | 0.69 | nylon 12 | 450 | 122 | 75 | 25 | −10 |
| Example 4 | nylon 11/maleic acid anhydride 100/1 parts by mass | 250 | 0.98 | nylon 12 | 350 | 121 | 85 | 25 | 0 |
| Example 5 | nylon 12/phthalic acid anhydride 100/1 parts by mass | 150 | 0.69 | nylon 11 | 450 | 125 | 80 | 25 | −5 |
| Example 6 | nylon 11/glutaric acid anhydride 100/1 parts by mass | 250 | 0.98 | nylon 11 | 350 | 129 | 75 | 20 | −10 |
| Comparative Example 1 | nylon 12 | 600 | 3.84 | none | | 125 | 25 | — | − | −40 |

MAA: methacrylic acid

Industrial Applicability

The optical fiber cord and the optical fiber cord with a plug of the present invention has superior humidity resistance and thermal resistance, and can be laid easily in a narrow site due to superior flexibility, and is inexpensive. The optical fiber cord and the optical fiber cord with a plug of the present invention can be favorably employed in uses that demand thermal resistance such as installation in a vehicle or in factory automation (FA).

Moreover, the present invention can be implemented in a variety of other forms without departing from the essential characteristics thereof. The examples described above are simply examples, and are not to be interpreted as limiting. In addition, the scope of the present invention is shown by the claims, and in the specification, there are no constraints. In addition, modifications and alterations within the equivalent scope of the claims are all within the scope of the present invention.

What is claimed is:

1. An optical fiber cord comprising an optical fiber and a primary covering layer on the outer periphery of the optical fiber that is formed from a polyamide resin containing at least one of an organic acid or an organic acid anhydride, wherein the total amount of organic acid and organic acid anhydride is 0.01 to 10 parts by mass per 100 parts b mass of the polyamide resin.

2. An optical fiber cord according to claim 1, wherein the primary covering layer contains an organic acid anhydride and does not contain an organic acid.

3. An optical fiber cord having a secondary covering layer on the outer periphery of the optical fiber cord according to claim 1.

4. An optical fiber cord according to claim 1, wherein the organic acid is one or a plurality of compounds selected from the group consisting of methacrylic acid, acrylic acid, maleic acid, fumaric acid, salicylic acid, succinic acid, glutaric acid, and phthalic acid.

5. An optical fiber cord according to claim 1, wherein the organic acid anhydride is one or a plurality of compounds selected from the group consisting of methacrylic acid anhydride, acrylic acid anhydride, maleic acid anhydride, fumaric acid anhydride, salicylic acid anhydride, succinic acid anhydride, glutaric acid anhydride, and phthalic acid anhydride.

6. An optical fiber cord according to claim 1, wherein the ratio of the cross-sectional area of the primary covering layer to the cross-sectional area of the optical fiber is from 0.6 to 3.5.

7. An optical fiber cord according to claim 1, wherein the extraction strength between the optical fiber and the primary covering layer is equal to or greater than 50 N.

8. An optical fiber cord according to claim 1, wherein the main component of the polyamide resin that forms the primary covering layer is nylon 12 or nylon 11.

9. An optical fiber cord with a plug, the plus being provided on at leaste one end of the optical fiber cord according to claim 3, wherein, at the end of the optical fiber cord having the plug, the primary covering layer is exposed, and the plug is fastened to the exposed primary covering layer.

10. An optical fiber cord according to claim 1, wherein a protective layer containing vinylidene fluoride is formed as the outermost peripheral part of the optical fiber.

11. An optical fiber cord comprising an optical fiber and a primary covering layer on the outer periphery of the optical fiber that is formed from a polyamide resin containing at least one of an organic acid or an organic acid anhydride, wherein the ratio of the cross-sectional area of the primary covering layer to the cross-sectional area of the optical fiber is from 0.6 to 3.5.

12. An optical fiber cord comprising an optical fiber and a primary covering layer on the outer periphery of the optical fiber that is formed from a polyamide resin containing at least one of an organic acid or an organic acid anhydride, wherein the extraction strength between the optical fiber and the primary covering layer is equal to or greater than 50 N.

13. An optical fiber cord comprising an optical fiber and a primary covering layer of the outer periphery of the optical fiber that is formed from a polyamide resin containing at least one of an organic acid or an organic acid anhydride, wherein the main component of the polyamide resin that forms the primary covering layer is nylon 12 or nylon 11.

14. An optical fiber cord with a plug having a plug on at least one end of an optical fiber cord,
  wherein the optical fiber cord comprising an optical fiber and a primary covering layer on the outer periphery of the optical fiber that is formed from a polyamide resin containing at least one of an organic acid or an organic acid anhydride,
  wherein the optical fiber code having a secondary covering layer on the periphery, and
  wherein, at the end of the optical fiber cord having the plug, the primary covering layer is exposed, and the plug is fastened to the exposed primary covering layer.

* * * * *